United States Patent Office 3,062,729
Patented Nov. 6, 1962

3,062,729
FOAMED ARTICLES OF ETHYLENE-PROPYLENE COPOLYMERS AND METHOD OF MAKING
Richard E. Skochdopole, Louis C. Rubens, and Giffin D. Jones, Midland, Mich., assignors to The Dow Chemical Company, Midland, Mich., a corporation of Delaware
No Drawing. Filed Apr. 10, 1961, Ser. No. 101,646
4 Claims. (Cl. 204—154)

This invention concerns foamed articles of ethylene-propylene copolymers and pertains to a method of making the same.

It is known to prepare cellular or foamed plastic articles by extruding a gel of a normally rigid polymer, e.g. polystyrene or polyethylene, and a volatile organic liquid or gaseous blowing agent, which is soluble in the polymer, at elevated temperatures and pressures into a zone of lower pressure wherein the extruded gel is expanded by vapors of the blowing agent and cooled by such expansion to the solidus point to produce a cellular article.

However, such method has not heretofore been applicable to the making of cellular or porous foamed articles from non-rigid elastomeric polymers such as rubber or rubber-like copolymers of ethylene and propylene for the reason that the foamed gel rapidly shrinks after the polymer has been foamed because of the inherent elastomeric properties of the polymeric material and a lack of dimensional stability in the foamed product.

It has now been discovered that stable foams can readily be prepared from polymeric olefin materials consisting of copolymers of from about 25 to about 65 percent by weight of ethylene and correspondingly from about 75 to about 35 percent of propylene, or mixtures of at least 80 percent by weight of one or more of such copolymers and not more than 20 percent by weight of polypropylene by a gel extrusion process which comprises: (a) forming a homogeneous gel of the olefin polymer material and a volatile organic compound as blowing agent selected from the group consisting of propane, isobutane, monochloropentafluoroethane, 1,1,1-trifluoro-2-chloroethane, 1,1,1-trifluoroethane, 1,1,1-trifluoropropane, octafluoropropane, dichlorodifluoromethane and dichlorortetrafluoroethane or mixtures of any two or more of such volatile organic compounds, under pressure at temperatures between 105° and 180° C.; (b) cooling or bringing the gel under pressure to a foaming temperature within the range of from 30° to 90° C.; (c) extruding the gel into a zone of lower pressure, or releasing the pressure on the gel, sufficient to cause expansion of the gel and form a cellular or porous foamed body; and (d) subjecting the foamed plastic body to bombardment with high speed electrons of a velocity sufficient to pentrate the foam and subject the foam to a dose of from one to about 20 megarads in a period of from one to 1800 seconds, prior to substantial shrinking of the foamed polymeric material.

It is an important and essential embodiment of the invention that the foamed plastic body be subjected to radiation by high energy ionizing radiation, e.g. high speed electrons, in amount sufficient to inhibit or substantially stabilize the foamed elastomeric polymer against shrinking. An amount of such radiation corresponding to a dose of from about one to about twenty megarads, is usually satisfactory. It is also important that the radiation be applied to the foamed material within a relatively short period of time after foaming the gel, e.g. with a period of from about one second to thirty minutes or less, in order to avoid appreciable shrinking of the foam prior to its being stabilized by the high energy ionizing radiation.

The copolymers of ethylene and propylene to be employed in the process are elastomeric copolymers of from about 25 to about 65 percent by weight of ethylene and from about 75 to 35 percent of propylene having a low degree of crystallinity when examined by X-ray diffraction methods, usually 10 percent or less crystallinity, and the copolymer may be molecular weight of from about 60,000 to 500,000 or higher. The polymeric starting material can consist entirely of the copolymer of ethylene and propylene, or it can consist of a mixture or a mechanical blend of the copolymer with up to 20 percent by weight of the mixture or blend being a homopolymer of propylene. It may be mentioned that the use of such mixtures or blends of the copolymer and the polypropylene results in the formation of a foamed product having a preponderance of open or inter-connected cells, whereas in general the use of the copolymer alone, forms foamed products having a predominant amount of closed cells, but this is dependent in part upon the kind and amount of the volatile organic compound employed as the foaming or blowing agent and in part upon the temperature of the gel when extruded into the zone of lower pressure.

It is important in preparing the gel that the polymeric material be heated in contact with the volatile organic compound at temperatures above the crystallinity point of the polymer so as to intimately and uniformly distribute or dissolve the volatile organic compound in the polymer and produce a homogeneous gel. The gel is then brought to a uniform foaming temperature throughout its mass, at least at a point just prior to extrusion into a zone of lower pressure, within the range of from about 30° to about 90° C. and at a temperature above the boiling point of the volatile organic compound at said lower pressure such that the extruded gel expands at the lower pressure by vaporization or expansion of the volatile organic compound contained therein to produce a porous foamed body.

The polymeric starting material and the volatile organic blowing agent can be used in any desired proportions, suitably in amounts corresponding to from about 0.05 to about 0.5 gram molecular proportion or more of the volatile organic compound per 100 grams of the polymer. The polymer starting material is insoluble in said foaming agents and merely dissolves a given amount of said agent depending in part upon the particular compound and the temperature employed so that any excess of the volatile organic blowing agent above that which dissolves in the polymer under the conditions employed is present as excess and non-essential material.

The high energy ionizing radiation is preferably high speed electrons of a velocity equivalent to at least 30,000 electron volts, and needs to be applied at a rate such that a dose of from 1 to 20 megarads is absorbed by the foam in a time of from 1 to 1800 seconds. Suitable sources of such high energy ionizing radiation are Van de Graaff generators, linear accelerators, resonant transformers, X-ray machines and the like.

The porous or cellular foamed product is a stable flexible resilient foam having for the most part a closed cell structure, or a substantial proportion of open or inter-connected cells, and is useful for a variety of purposes e.g. as synthetic sponges, cushions, resilient pads, and the like.

The following examples, illustrate ways in which the principle of the invention has been applied, but are not to be construed as limiting its scope.

EXAMPLE 1

A charge of 40 grams of a copolymer of 27.5 percent by weight of ethylene and 72.5 percent of propylene having a molecular weight of about 260,000, and 43 grams of dichlorotetrafluoroethane were placed in a steel bomb equipped with a frangible disc and an extrusion orifice 3.2 millimeters in diameter at one end and a valved inlet at the other. The bomb and its contents were heated at a temperature of 150° C. for 3 hours, then was cooled and maintained at 70° C. for 1.5 hours. Thereafter, nitrogen gas was fed to the bomb under a pressure of about 750 pounds per square inch gauge pressure sufficient to rupture the frangible disc and force the gel of the copolymer and the dichlorodifluoromethane blowing agent out of the 3.2 millimeter orifice into the atmosphere. The extruded gel foamed to a cellular tape or ribbon. The foam was passed under a beam of high speed electrons from a Van de Graaff generator operating at a current of 150 micro-amperes and 2 mev. potential. The dose of high energy radiation applied to the foam was about 1 megarad. The extruded gel formed a cellular article approximately 0.5 inch wide by 12 feet long which foam was 18.5 times the volume of the gel. After storing at room temperature for 67 hours the foam was 14.2 times the volume of the gel. The foam was closed celled and was soft and resilient. Similar results were obtained employing a copolymer of 65 percent by weight of ethylene and 35 percent of propylene, which copolymer had a viscosity of 0.253 centipoise as determined for a 0.1 weight percent solution of the copolymer in decalin at 25° C.

EXAMPLE 2

A charge of 90 percent by weight of a copolymer of 27.5 percent by weight of ethylene and 72.5 percent of propylene having a viscosity characteristic of 0.078 centipoise as determined for a 0.02 weight percent solution of the copolymer in decalin at 25° C., a molecular weight of about 260,000 and having about 7 percent crystallinity, was compounded with 10 percent by weight of polypropylene to form a homogeneous composition. A charge of 30 grams of the composition and 35 ml. of liquid dichlorodifluoromethane were sealed in a steel bomb of ⅞ inch material diameter about 8 inches long and equipped with a frangible disc at one end and a valved inlet at the other. The bomb and its contents were heated at a temperature of 160° C. for a period of 3 hours, then was cooled to a temperature of 40° C. and maintained at this temperature for 1¼ hours. Thereafter, nitrogen gas was fed to the bomb through the valved inlet to a pressure of 750 pounds per square inch gauge pressure to rupture the frangible disc. The gel was extruded from the bomb through a Z-nickel orifice of 6.4 millimeters diameter into the atmosphere. The extruded gel foamed to a cellular mass and was immediately passed under a beam of high speed electrons from a Van de Graaff generator operating at 250 microamperes and 2 mev. potential. The total dose of high energy ionizing radiation applied to the foam was 5 megarads. The irradiated foam was stored for a period of time and was observed from time to time and the volume of the foam recorded. The change in the volume of the foam with time was as follows.

Time after extrusion: Volume of foam/volume of gel
- 5 min _____ 32.5
- 68 hrs _____ 20
- 7 days _____ 19.6
- 14 days _____ 18.4
- 49 days _____ 17.8

The foam product was a flexible resilient body having 84 percent open cells and was found to contain 41.6 percent by weight of material insoluble in decalin at 160° C.

For purpose of comparison a foam was prepared in similar manner from a like composition and blowing agent, except that the foam was not subjected to ionizing radiation. This foam shrunk to a volume of only 11.8 times the volume of the gel after storing for a period of only 16 hours.

EXAMPLE 3

A charge of 50 grams of a copolymer of 30.5 percent by weight of ethylene and 69.5 percent of propylene having a molecular weight of about 120,000 and 30 ml. of dichlorotetrafluoroethane were sealed in a steel bomb of ⅞ inch internal diameter having a frangible nickel disc on one end and a valved inlet on the other. The bomb and its contents were heated at a temperature of 160° C. for a period of 3.5 hours, then was cooled to 45° C. and maintained at this temperature for 0.45 hour. Thereafter, nitrogen gas was fed under pressure to the bomb sufficient to rupture the frangible disc, about 750 pounds per square inch gauge pressure, and explosively eject the gel into the atmosphere wherein it foamed to a cellular body. About 30 minutes after foaming of the gel, the foam was subjected to high speed electrons from a Van de Graaff generator operating at a beam current of 150 microamperes and 2 mev. potential for a total dose of 6 megarads. The irradiated foam had a volume 10 times the volume of the gel and was closed celled. No shrinking of the foam occurred after 13 days' storage at room temperature and atmospheric pressure.

EXAMPLE 4

In each of a series of experiments, a charge of 5 grams of a copolymer of about 27.5 percent by weight of ethylene and about 72.5 percent of propylene which copolymer was similar to that employed in Example 2, was sealed in a heavy walled glass ampoule together with 10 ml. of volatile organic compound as blowing agent of a kind and in amount as stated in the following table. The glass ampoule and contents were heated at a temperature of 120° C. or 150° C. for a period of 135 minutes, then was cooled and maintained at a temperature as stated in the table for a period of one hour. Thereafter, the glass ampoule was broken by dropping it on a steel plate, thereby allowing the copolymer to be explosively foamed. The foam was recovered and was subjected to high energy ionizing radiation by passing it under a beam of high speed electrons from a Van de Graaff accelerator operating at a beam current of 150 microamperes and 2 mev. potential for a total dose of 5 megarads, which was delivered within a period of from 3 to 5 minutes after foaming. Each of the experiments was run in duplicate. One body of the foam product was subjected to irradiation with high speed electrons. The other body of foam product was not irradiated. Each of the foamed products was stored at room temperature and atmospheric pressure for a prolonged period of time and was observed at successive intervals of time. After storing for a period of 1486 hours the volume of the irradiated and non-irradiated foams were compared to determine the shrinkage. Table 1 identifies the experiments and names the volatile organic compound employed as foaming agent. In the table the shrinkage is expressed as the ratio of the volume of the irradiated foam divided by the volume of the non-irradiated foam after storing for a period of time specified above. All of the foams were of closed cell structure.

*Table 1*

| Run No. | Foaming Agent | | Copolymer, gms. | Gelling Temp., ° C. | Foaming Temp., ° C. | Vol. of Irradiated Foam/Vol. of Non-irradiated foam |
|---|---|---|---|---|---|---|
| | Kind | Ml. | | | | |
| 1 | $C_2Cl_2F_4$ | 10 | 5 | 150 | 60 | 1.36 |
| 2 | $CCl_2F_2$ | 10 | 5 | 150 | 50 | 1.70 |
| 3 | $i$-$C_4H_{10}$ | 10 | 5 | 120 | 50 | 1.34 |
| 4 | $CH_2Cl$-$CF_3$ | 10 | 5 | 120 | 70 | 1.56 |

EXAMPLE 5

A copolymer of 43 mole percent of ethylene and 57 mole percent of propylene which copolymer had a molecular weight of about 70,000 and a crystallinity of 3.9 percent as determined by X-ray diffraction and which was in the form of fine granules of sizes from 2–5 millimeters, was immersed in liquid dichlorodifluoromethane for a period of 2 hours. The copolymer was drained and while wet with the dichlorodifluoromethane was fed at a rate of 36 grams per minute into the barrel of a plastics extruder having a screw feeder 1.25 inches in diameter by about 30 inches long. The copolymer was pressed and heated in the extruder at temperatures between about 100° and 120° C. and was mixed with dichlorotetrafluoroethane fed to a midsection of the extruder barrel under pressure at a rate of 24 grams per hour. The resulting materials were thoroughly blended with one another under pressure to form a flowable gel in the remaining portion of the extruder barrel; and was brought to a temperature of about 85° C. just prior to extruding the gel through an orifice into the atmosphere wherein the extruded material expanded to form a cellular product having a density of 9.4 pounds per cubic foot of the foam. A stable foam is obtained by subjecting it to high energy ionizing radiations at a dose of from 1 to 5 megarads, e.g. high speed electrons from a Van de Graaff generator operating at 250 microamperes beam current and 2 mev. potential.

We claim:

1. A method for making a foamed plastic article which comprises forming a homogeneous gel of an olefin polymer material selected from the group consisting of copolymers of from 25 to 65 percent by weight of ethylene and from 75 to 35 percent of propylene, and mixtures of at least 80 percent by weight of such copolymer and not more than 20 percent by weight of polypropylene, and at least one volatile organic compound selected from the group consisting of isobutane, propane, 1,1,1-trifluoro-2-chloroethane, 1,1,1-trifluoroethane, monochloropentafluoroethane, 1,1,1-trifluoropropane, octafluoropropane, dichlorodifluoromethane and dichlorotetrafluoroethane at temperatures between 105° and 180° C. under pressure, cooling said gel to a foaming temperature within the range of from 30° to 90° C., then releasing the pressure sufficiently to expand the extruded gel and form a porous body and subjecting the porous body to bombardment by high speed electrons of a velocity sufficient to penetrate the foam and subject the foam to a dose of from one to 20 megarads in a period of from 1 to about 1800 seconds.

2. A method as claimed in claim 1, wherein the olefin polymer material is a copolymer of ethylene and propylene and the volatile organic compound is dichlorotetrafluoroethane.

3. A method for making a foamed plastic article which comprises forming a homogeneous gel of an olefin polymer material consisting of at least 80 percent by weight of a copolymer of from 25 to 65 percent by weight of ethylene and from 75 to 35 percent of propylene and not more than 20 percent by weight of polypropylene, and dichlorodifluoromethane at temperatures between 105° and 180° C. under pressure, cooling said gel to a foaming temperature within the range of from 30° to 90° C. extruding the gel into a zone of lower pressure sufficient to expand the extruded gel and form a porous body and subjecting the porous body to bombardment by high speed electrons of a velocity sufficient to penetrate the foam and subject the foam to at least one million volts to a dose of from one to 20 megarads.

4. A method as claimed in claim 3, wherein the olefin polymer material is a blend of about 90 percent by weight of a coplymer of ethylene and propylene and about 10 percent of polypropylene.

References Cited in the file of this patent

UNITED STATES PATENTS

| | | |
|---|---|---|
| 2,948,664 | Rubens et al. | Aug. 9, 1960 |
| 2,948,665 | Rubens et al. | Aug. 9, 1960 |
| 2,952,593 | Rubens | Sept. 13, 1960 |